United States Patent
Czysz (10) Patent No.: US 7,328,910 B2
(45) Date of Patent: Feb. 12, 2008

(54) MOTORCYCLE REAR SUSPENSION WITH LINEAR SPRING RATE AND LINKAGE CONTROLLED SHOCK RATE

(75) Inventor: Michael Czysz, Portland, OR (US)

(73) Assignee: MotoCzysz LLC, Portland, OR (US)

( * ) Notice: Subject to any disclaimer, the term of this patent is extended or adjusted under 35 U.S.C. 154(b) by 292 days.

(21) Appl. No.: 11/001,164

(22) Filed: Dec. 1, 2004

(65) Prior Publication Data

US 2006/0113134 A1 Jun. 1, 2006

(51) Int. Cl.
*B62K 19/30* (2006.01)
(52) U.S. Cl. ........................ 280/284; 280/285; 180/227
(58) Field of Classification Search ................ 280/284, 280/285; 180/227
See application file for complete search history.

(56) References Cited

U.S. PATENT DOCUMENTS

| | | | | |
|---|---|---|---|---|
| 4,457,393 A | * | 7/1984 | Tamaki et al. ............... | 180/227 |
| 4,556,119 A | * | 12/1985 | Shiratsuchi ................. | 180/219 |
| 4,582,343 A | * | 4/1986 | Waugh ........................ | 280/284 |
| 4,673,053 A | * | 6/1987 | Tanaka et al. ............... | 180/227 |
| 4,830,395 A | * | 5/1989 | Foley .................. | 280/124.162 |
| 5,282,517 A | * | 2/1994 | Prince ......................... | 180/227 |
| 5,348,112 A | * | 9/1994 | Vaillancourt ................ | 180/227 |
| 6,481,523 B1 | * | 11/2002 | Noro et al. .................. | 180/227 |
| 6,581,711 B1 | * | 6/2003 | Tuluie ......................... | 180/227 |
| 6,823,958 B2 | * | 11/2004 | Domenicali et al. ........ | 180/227 |
| 7,121,570 B2 | * | 10/2006 | Parker ......................... | 280/285 |
| 2005/0167943 A1 | * | 8/2005 | Inaba et al. ................. | 280/284 |
| 2006/0061059 A1 | * | 3/2006 | Lesage et al. .............. | 280/284 |

* cited by examiner

*Primary Examiner*—Lesley D. Morris
*Assistant Examiner*—Marlon Arce-Diaz
(74) *Attorney, Agent, or Firm*—Chernoff, Vilhauer, McClung & Stenzel, LLP (57) ABSTRACT

A motorcycle having an improved rear suspension in which the shock leverage rate is decoupled from the spring leverage rate. The springs are coupled directly between the swingarm and the frame, while the shock is coupled to the swingarm and coupled to the engine by a linkage. The rear suspension has a substantially linear spring leverage rate, and a different shock leverage rate which is determined by the linkage and is not necessarily linear. The springs are coupled to the swingarm by a spring base which threads into a ride height adjuster cup which is coupled to the swingarm and which can be rotated to raise and lower the ride height, and a preload cup which is coupled to the frame and which can be rotated to increase and decrease the preload on the spring.

19 Claims, 9 Drawing Sheets

MOTORCYCLE REAR SUSPENSION WITH LINEAR SPRING RATE AND LINKAGE CONTROLLED SHOCK RATE

BACKGROUND OF THE INVENTION

1. Technical Field of the Invention

This invention relates generally to motorcycle suspension components, and more specifically to rear suspension spring and shock absorber coupling geometries.

2. Background Art

Motorcycles have been provided with a variety of rear suspension types. Some "hard tail" motorcycles have no rear suspension, with a rear axle being directly coupled to a unitary and substantially rigid frame. Other motorcycles have two-piece frame structures, with a primary frame holding the engine, and a swingarm holding the rear axle. The front end of the swingarm is coupled to a swingarm pivot which is part of the frame or, in some cases, the engine. The swingarm pivots about this connection such that the rear axle is free to move substantially vertically up and down, enabling the rear tire to track bumps and holes in the road surface.

One or two springs are installed between the swingarm and the frame, to support the weight of the motorcycle and rider and thereby prevent the swingarm from collapsing to its uppermost position of travel. Most commonly, compression coil springs are used.

In order to dampen any oscillatory modes, and in order to absorb shock loads, a corresponding number of shock absorbers (sometimes referred to as dampers or dampeners or simply shocks) are also coupled between the swingarm and the frame. Most commonly, these are of the conventional valved hydraulic piston type.

Traditionally, a spring and its companion shock are combined into a single "coil over shock" unit, in which the shock is coaxially disposed within the coil spring, and in which the shock and spring are compressed and extended as a single unit. Typically, the ends of the coil spring are held in position by flanges built into the ends of the shock assembly, such that the two ends of the shock are respectively coupled to the swingarm and to the frame, and the coil spring itself is not directly coupled to the swingarm or the frame. Thus, the coil spring shares the shock's mounting points and is indirectly coupled to the frame and to the swingarm.

The term "spring rate" is generally used to describe the stiffness or strength of a spring, and is measured as the amount of force necessary to compress or extend the spring a predetermined distance. For example, a spring with a 40 kg/cm coil spring will compress an additional 1 cm for every extra 40 kg weight stacked atop it. Some coil springs are "progressively wound", with some coils more closely spaced than others. The closer coils are more perpendicular to the axis of the spring, and are therefore "softer".

The term "spring leverage rate" will be used in this disclosure to describe the amount of travel of a spring (or, in other words, the change in the axial length of the spring) relative to the amount of travel of a lever arm to which it is attached (specifically, the swingarm lever arm from the swingarm pivot to the rear axle). If the spring is compressed 1 cm for every 4.5 cm of rear axle travel, the suspension has a 4.5:1 spring leverage rate.

Similarly, the term "shock leverage rate" will be used in this disclosure to describe the amount of travel of a shock absorber (or, in other words, the change in the axial length of the shock absorber) relative to the amount of travel of the swingarm lever arm at the rear axle. If the shock is shortened 1 cm for every 3 cm of rear axle travel, the suspension has a 3:1 shock leverage rate.

If a spring leverage rate or a shock leverage rate does not vary non-trivially over the range of motion of the rear axle, it will be said to have a "linear rate". If the leverage rate varies non-trivially over the range of motion of the rear axle, it will be said to have a "progressive rate". If the leverage rate increases as the rear axle rises (meaning that the farther the rear axle moves, the greater the relative change in the shock or spring length is), the progressive rate is said to be a "rising rate". If the leverage rate decreases as the rear axle rises (meaning that the farther the rear axle moves, the less relative change there is in the shock or spring length), the progressive rate is said to be a "falling rate".

In some motorcycles, typically those from the 1960s such as the Norton Commando, the lower end of the coil-over shock was connected directly to the swingarm, and the upper end of the coil-over shock was connected directly to the frame. This results in a roughly linear leverage rate being applied to both the spring and the shock. In other words, the spring force is approximately directly proportional to the position of the rear axle, and the dampening force is approximately directly proportional to the velocity of the rear axle regardless of the position of the rear axle.

In other motorcycles, typically newer models such as the Ducati 999 or the Suzuki GSX-R, the coil-over shock is not directly connected to the swingarm (or, in a few cases, to the frame), but is connected via a "linkage" which includes a set of pivotably interconnected lever arms whose geometry is designed to give the coil-over shock a progressive leverage rate. In virtually all cases, the progressive leverage rate is a rising rate accompanied by large quantities of marketing hype.

In contrast, one author has suggested that the Kawasaki Uni-Trak system which was introduced in 1980 was a falling-rate suspension.

Some motorcycles have used a pair of coil-over shocks—one on each side of the rear wheel—while other motorcycles have used a single coil-over shock, a trend which began with late 1970's dirt bikes. To achieve the same spring power as a pair of springs, a single spring will generally have to be twice as heavy as either of the springs in the pair; in other words, the single spring will weigh approximately as much as the pair of springs together. However, to achieve the same dampening power as a pair of shock absorbers, a single shock absorber does not need to weigh twice as much and, in fact, may be the same weight or only slightly heavier than either one of the pair of shocks.

Unfortunately, if the shock absorber were eliminated from the coil-over shock on only one side of the swingarm, the swingarm would be subjected to significant torsional forces during operation of the motorcycle, as the dampening force would be applied asymmetrically to only the other side of the swingarm.

More significantly, having the springs and the shock absorbers operating in lock-step forces the designer to make undesirable tradeoffs and compromises in the linkage geometry.

What is needed, then, is an improved motorcycle suspension which decouples the springs from the shock absorbers, granting the designer greatly increased freedom in selecting linkage geometry and component placement.

DETAILED DESCRIPTION

The invention will be understood more fully from the detailed description given below and from the accompanying drawings of embodiments of the invention which, however, should not be taken to limit the invention to the specific embodiments described, but are for explanation and understanding only.

Figure 1:
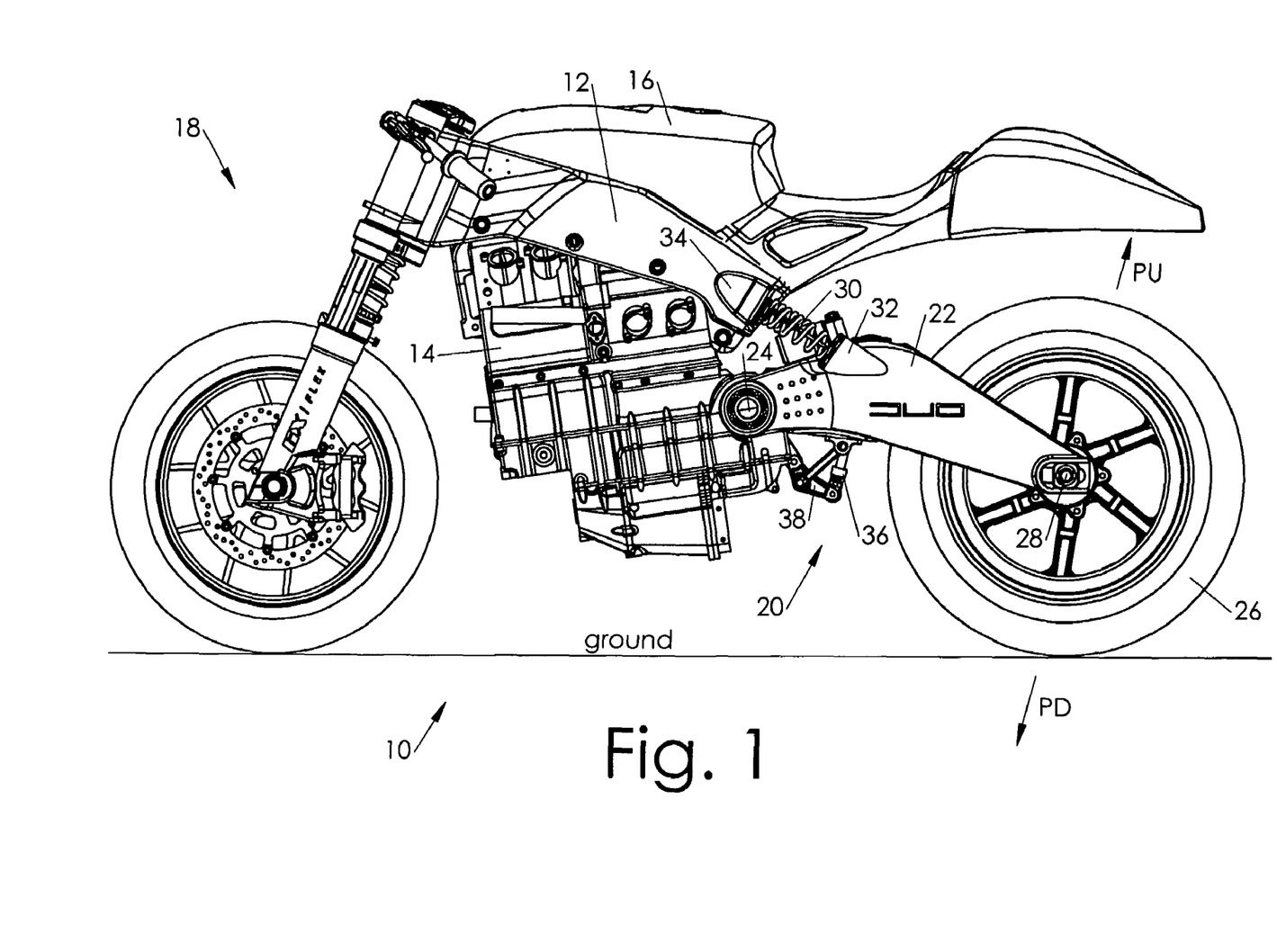
FIG. 1 shows a motorcycle including one embodiment of the rear suspension of the present invention, with the rear wheel in a lowermost position.

FIG. 1 illustrates a motorcycle 10 including a frame 12 to which are coupled an engine 14, a fuel tank 16, a front suspension 18, and a rear suspension 20 according to one embodiment of this invention.

The rear suspension is coupled to the frame or, as shown, to the engine which comprises a stressed member of the frame. The rear suspension includes a swingarm 22 which is coupled to the frame or engine so as to rotate about a swingarm pivot 24. A rear wheel assembly 26 is coupled to the rear end of the swingarm by a rear axle 28.

The rear suspension further includes one or more springs 30 which are coupled between the swingarm and the frame (or engine). The bottom end of each spring is coupled to or held by a swingarm spring coupling fixture 32, and the top end of each spring is coupled to or held by a frame spring coupling fixture 34. As the rear suspension pivots up (as indicated by arrow PU) and down (as indicated by arrow PD), the distance between the spring coupling fixtures, and thus the length of the spring, decreases and increases in a spring leverage rate which is generally linear but is not necessarily exactly linear. For example, if the spring coupling fixtures are positioned such that the swingarm pivot is not substantially normal to the center of the spring's axis, the spring leverage rate will have minor changes as the swingarm moves.

The rear suspension further includes one or more, but preferable a single, shock absorber 36 (view partially obstructed) which is coupled via a linkage 38. As the rear suspension pivots up and down, the length of the shock absorber is changed as dictated by the respective geometries of the linkage components, such that the shock absorber has a shock leverage rate which is independent and decoupled from the spring leverage rate. While the springs have a linear spring leverage rate, the shock absorber can have a rising rate, falling rate, linear rate, or any combination or permutation thereof, as the designer wishes.

Figure 2:
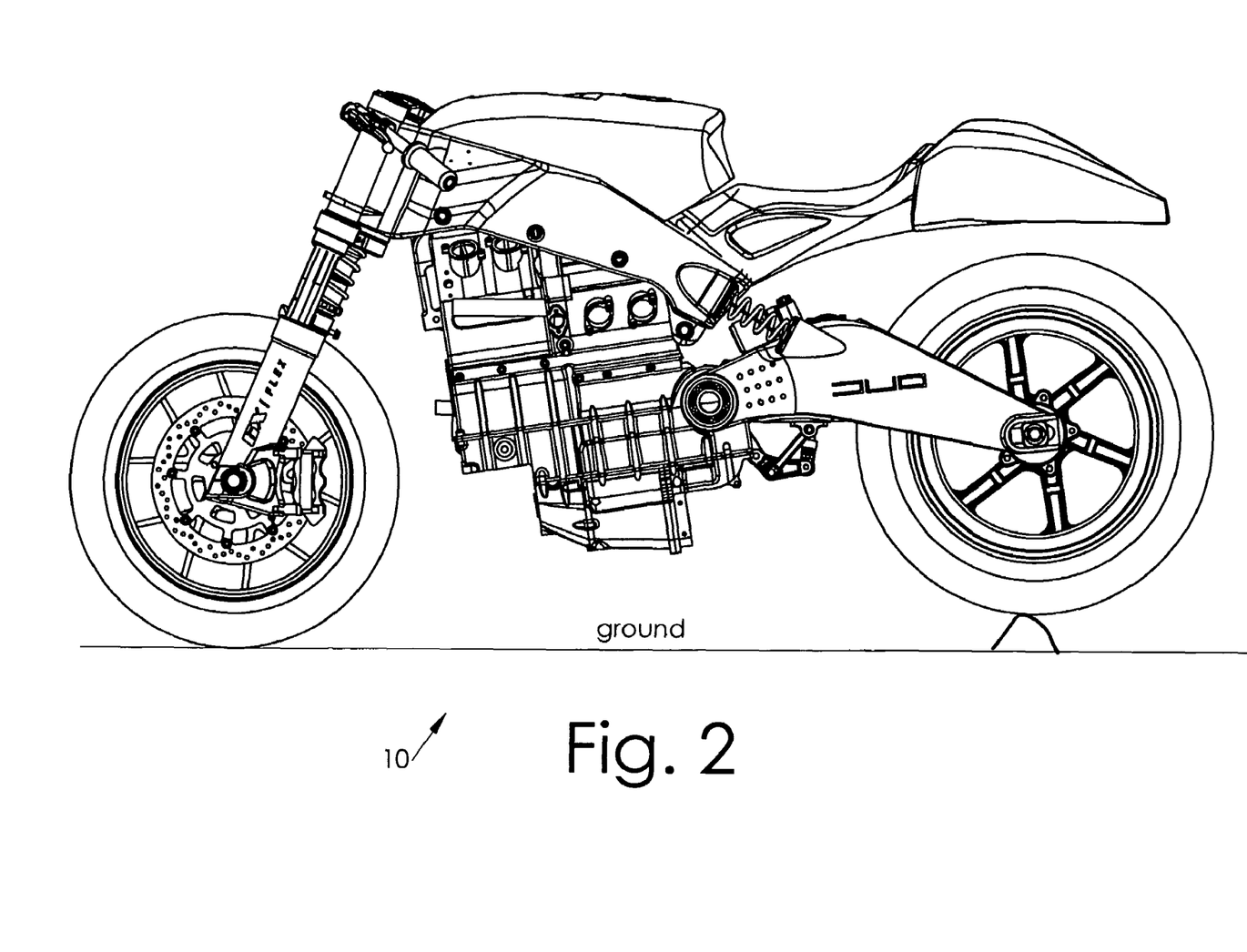
FIG. 2 shows the motorcycle of FIG. 1 with the rear wheel in a middle position.
Figure 3:
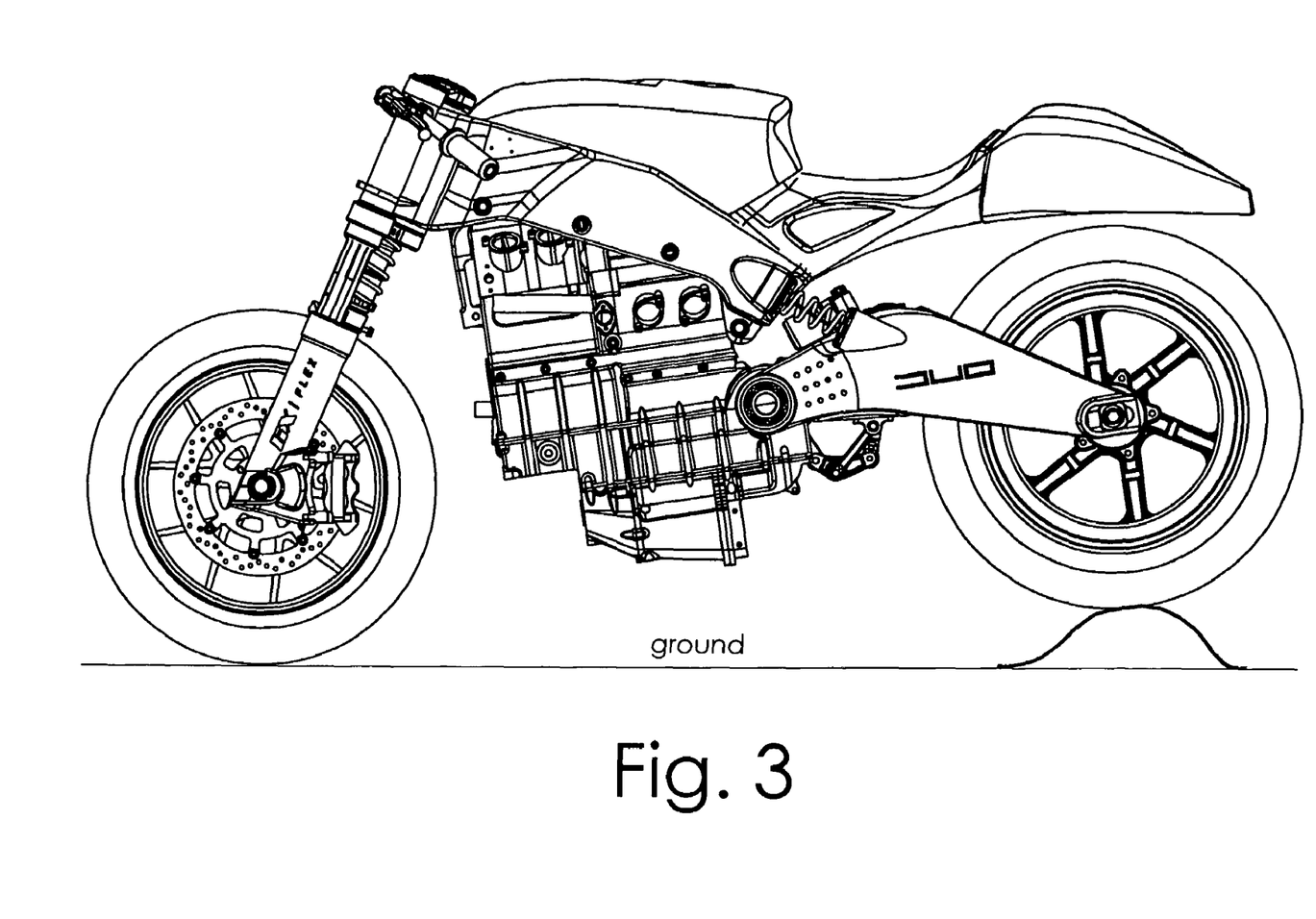
FIG. 3 shows the motorcycle of FIG. 1 with the rear wheel in an uppermost position.

FIGS. 1 through 3 illustrate the rear suspension moving from a lowermost position (FIG. 1) through a middle position (FIG. 2) to an uppermost position (FIG. 3). To help illustrate these positions, each of these figures shows the position of the ground in FIG. 1—where the rear tire sits when the suspension is at its bottom. (For ease of illustration and explanation, well-known concepts such as static sag are being ignored here, as such are well within the knowledge of ordinary skilled suspension designers and need not be reiterated here. Furthermore, for ease of illustration, many common components such as bearings, fasteners, bodywork, foot pegs, rear brakes, chain, sprockets, and so forth are omitted from this disclosure, as they, too, are well known and their illustration would not aid in understanding the present invention.)

Figure 4:
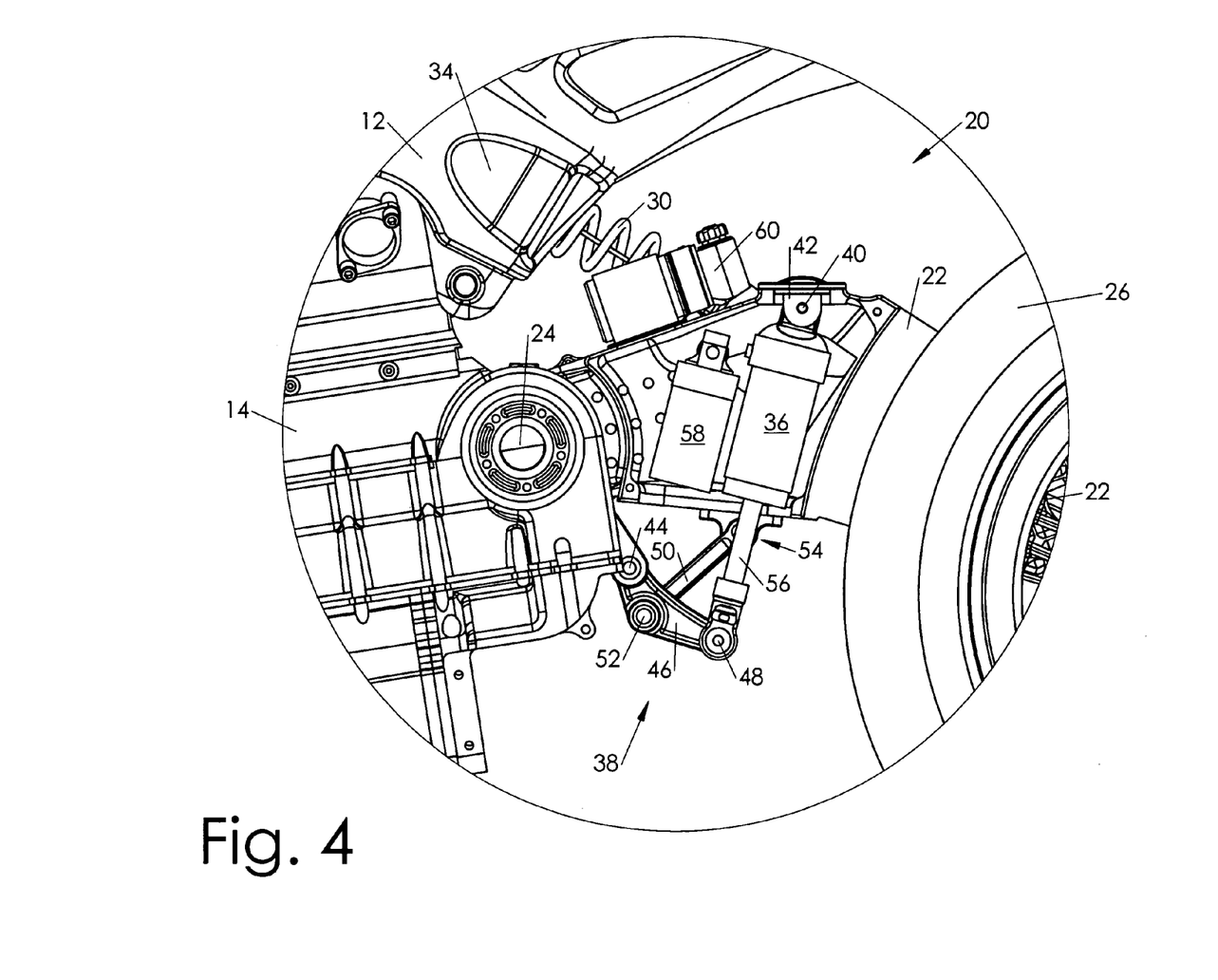
FIG. 4 shows a detail view of the rear suspension components, focusing on the shock linkage parts.

FIG. 4 is a close-up view of the rear suspension of FIG. 1, with a cutaway of the swingarm 22 for better visibility of other components. The swingarm pivots about the swingarm pivot 24 which is part of the engine 14 or the frame 12. The spring 30 is coupled between the swingarm and the frame or engine so as to have a linear leverage rate. The shock absorber or hydraulic dampener 36 is coupled to the linkage 38 to have a non-linear rate. An upper shock pivot 40 is coupled to a swingarm shock pivot 42 which is coupled to or integral with the swingarm. The linkage pivots about a linkage pivot 44 which is coupled to or integral with the engine or frame. The linkage includes a multiplier link 46 which has a first end coupled to the linkage pivot and a second end coupled to a lower shock pivot 48 of the shock absorber. A linking member 50 (often referred to as the "dogbone") is coupled between a center pivot 52 in a middle portion of the multiplier link and a swingarm pivot 54 (partially obscured behind the piston 56 of the shock absorber) which is coupled to or integral with the swingarm.

The shock absorber may include an optional piggyback reservoir 58 and/or 60. The length of the shock absorber, for linkage rate calculation purposes, is the distance from the upper pivot 40 to the lower pivot 48. In calculating suspension rates, one can use either the change in vertical position of the rear axle (not shown), or, to be more exactly correct, the length of the arc through which the rear axle swings around the swingarm pivot 24. Calculating the linkage rate is a complex mathematical problem, involving multiple members swinging around multiple pivot points, with some of the pivot points themselves moving through arcs. Other factors which must be considered include the relative lengths of: the swingarm from swingarm pivot to rear axle (which is, itself, adjustable), the multiplier link from linkage pivot to middle pivot, the multiplier link from middle pivot to lower shock pivot, dogbone length, geometric configuration of the swingarm itself (that is, the lengths of and angles between the upper shock pivot and upper dogbone pivot with respect to the swingarm pivot and rear axle), and the angle between the two legs of the multiplier link, and so forth.

In the preferred embodiment, there are a pair of springs—one at each side of the swingarm and set as widely as possible, to maximize the springs' ability to resist torsional movement of the swingarm. In the preferred embodiment, there is a single shock absorber, located as closely as possible to the midline or center of the rear suspension, to minimize torque upon the swingarm. In the preferred embodiment, to reduce torque upon the suspension components themselves a pair of multiplier links and a pair of dogbones are used, one of each on each side of the shock absorber; for clarity of illustration, only the right hand side multiplier link and dogbone are shown in FIG. 4.

Figure 5:
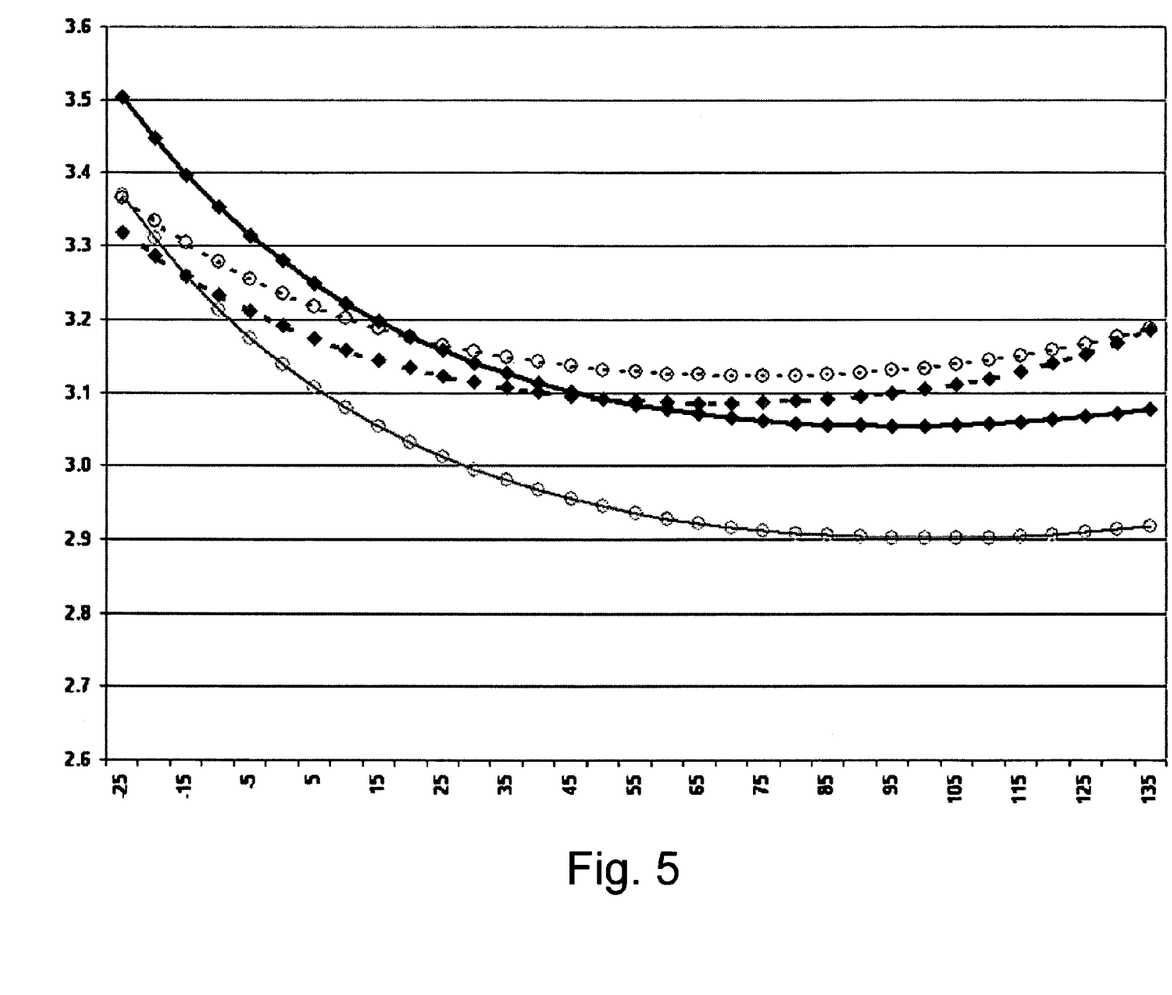
FIG. 5 is a graph showing four exemplary shock leverage rates which can be achieved with various sizes of suspension linkage components.

FIG. 5 illustrates the linkage rate curves for four particular sets of linkage geometries. The X (horizontal) axis gives the height of the rear axle relative to a neutral (zero or static sag) position, and the Y (vertical) axis gives the instantaneous linkage rate of the shock absorber at that position. It can be seen that, by selecting certain geometries for various ones of the suspension components, the linkage may be given a rising rate (the heavy solid line with solid diamonds), or a different rising rate (the light solid line with circles), or even a hybrid rate which is rising through part of the suspension travel and then falling through another part of the suspension travel (either of the dashed lines). Other rates and combinations of rates are certainly achievable; these are merely four examples and not an exhaustive list of the possibilities.

With the shock leverage rate decoupled from the spring leverage rate, the designer is able to achieve results which are both highly desirable and not previously possible.

The reader is pointedly cautioned that it has already been this inventor's experience that even leading industry experts (under non-disclosure agreements, of course) very often fail to correctly or fully grasp the principle of decoupling the hydraulic dampening from the spring, even after having it explained to them several times. Much of the old thinking about linkages was, as it turns out, related to spring leverage rates and not shock leverage rates.

Rear Ride Height Adjustment

Figure 6:
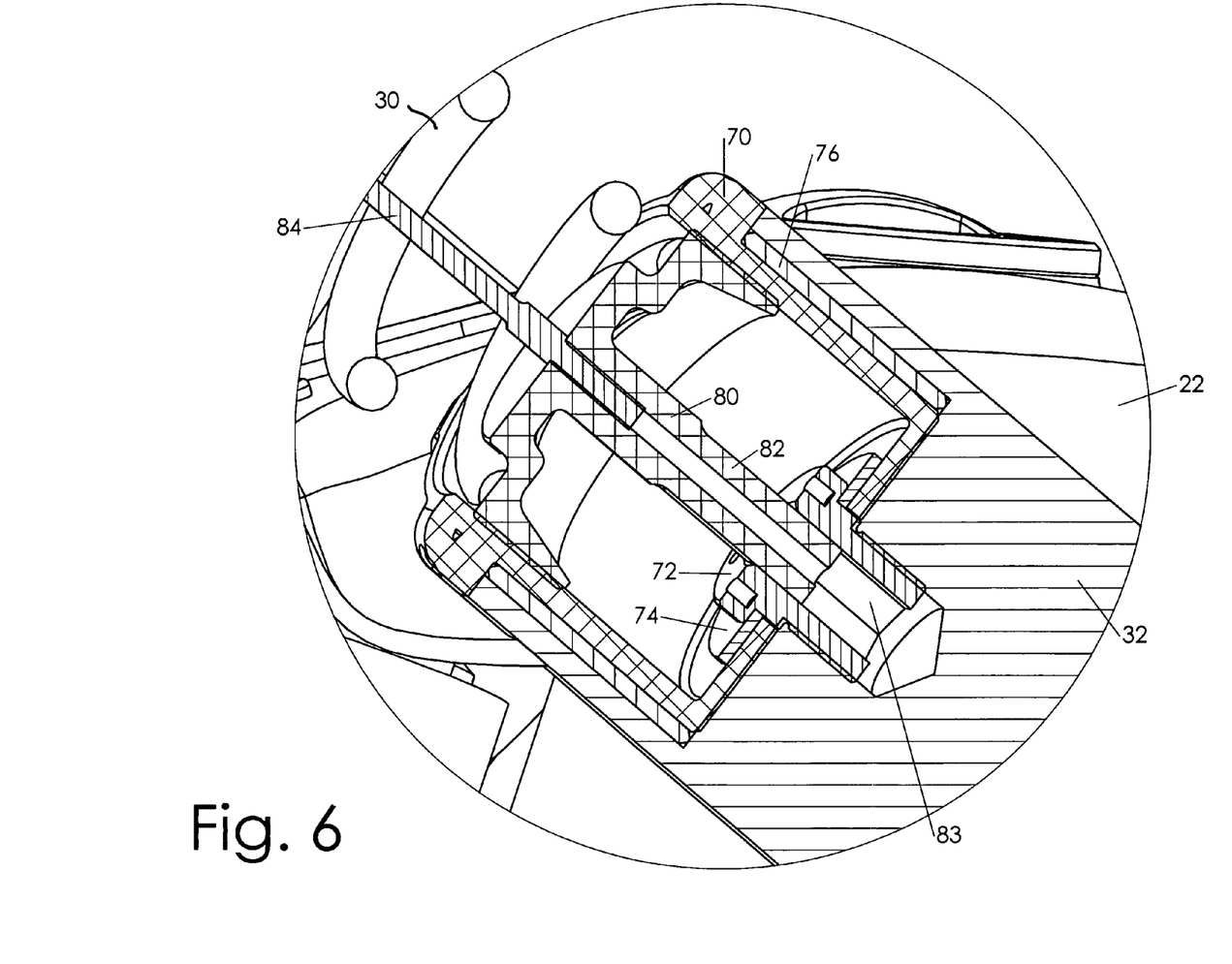
FIGS. 6 and 7 show detail views of the rear ride height adjustment mechanism.

FIG. 6 is a close-up view of the section of the rear suspension where the lower end of the spring 30 contacts the swingarm 22, with some of the components cross-sectioned. The swingarm includes a lower spring coupling fixture 32 which may be integral with or coupled to the swingarm. A ride height adjuster cup 70 is disposed within the lower spring coupler. A bolt 72 fits through an axial hole in the bottom of the ride height adjuster cup and threads into a corresponding threaded hole in the bottom of the coupling fixture, preventing the ride height adjuster cup from moving axially out of the coupling fixture. A Teflon washer 74 reduces friction between the bottom of the cup and the bolt, and a Teflon bushing 76 reduces friction between the outer cylindrical wall of the cup and the inner cylindrical wall of the coupling fixture. Thus, the ride height adjuster cup is free to rotate, but is held in an axial position with respect to the swingarm.

Figure 7:
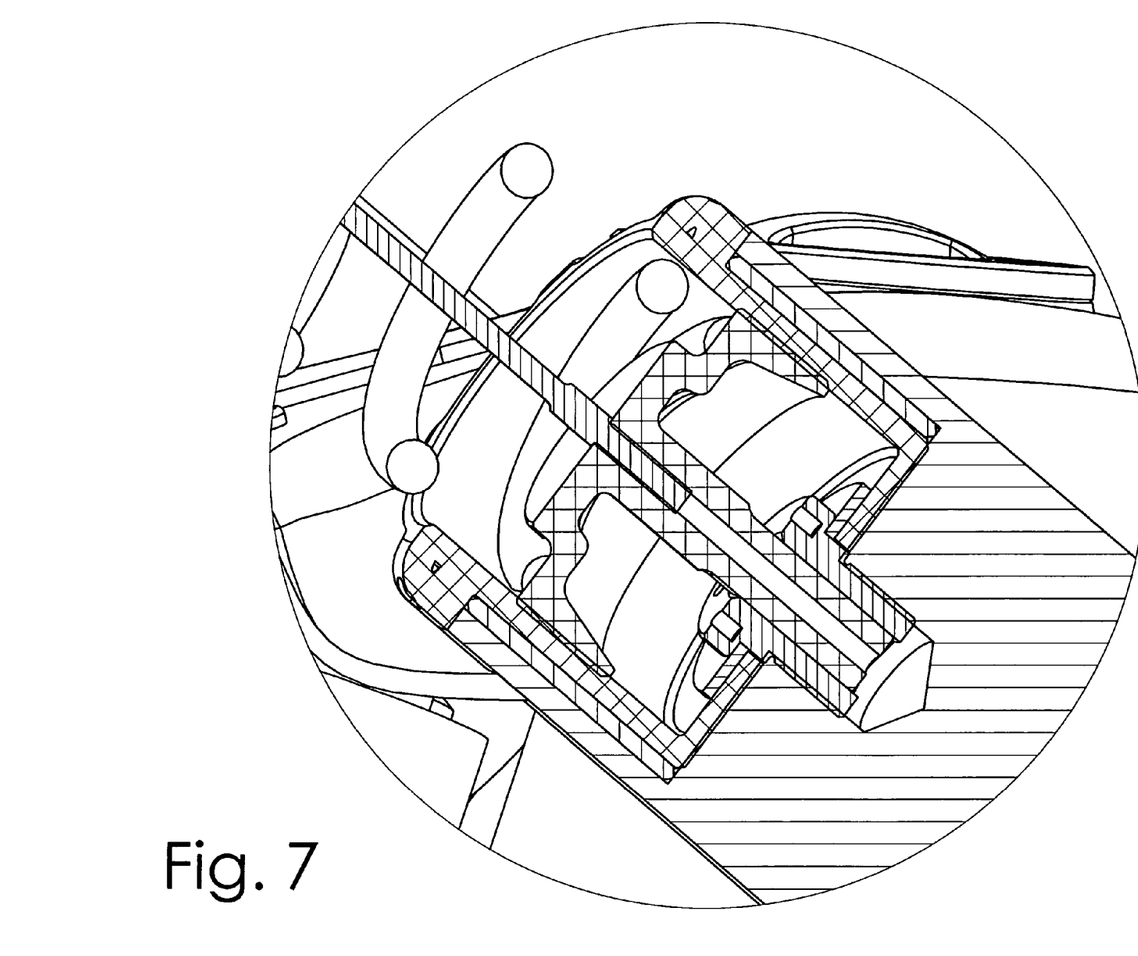

A lower spring base 80 is disposed within the ride height adjuster cup. A threaded outer cylindrical wall of the lower spring base engages a threaded inner cylindrical wall of the cup. The spring base has a stem 82 which has a non-cylindrical cross-sectional shape. In one embodiment, the stem is hexagonal. The stem engages a correspondingly shaped axial hole 83 in the bolt. Thus, the bolt prevents the stem from rotating. When the ride height adjuster cup is rotated, the lower spring base is threaded out of or into the ride height adjuster cup. This raises (FIG. 6) the bottom end of the spring into the swingarm, or lowers (FIG. 7) the bottom end of the spring out of the swingarm, changing the rear ride height of the motorcycle. Because the ride height adjuster cup itself does not move in or out of the swingarm, the ride height can be adjusted without altering the visual appearance and aesthetic appeal of the rear suspension assembly.

In some embodiments, the ride height adjuster cup can be provided with a mechanism (not shown) for securely holding it in a predetermined position. In one such embodiment, the lower surface of the bottom of the cup includes one or more holes or indentations arranged in a radial pattern equidistant from the axis of the cup, and the coupling fixture includes one or more "clicker" spring-loaded balls which are positioned to engage these holes or indentations at predetermined rotational positions.

Each of the rear springs is equipped with a similar ride height adjustment system, so the two sides can be adjusted to a same ride height, maintaining suspension symmetry.

A rod 84 is threaded into an axial hole in the lower spring base, and will be described below.

Rear Spring Preload Adjustment

Figure 8:
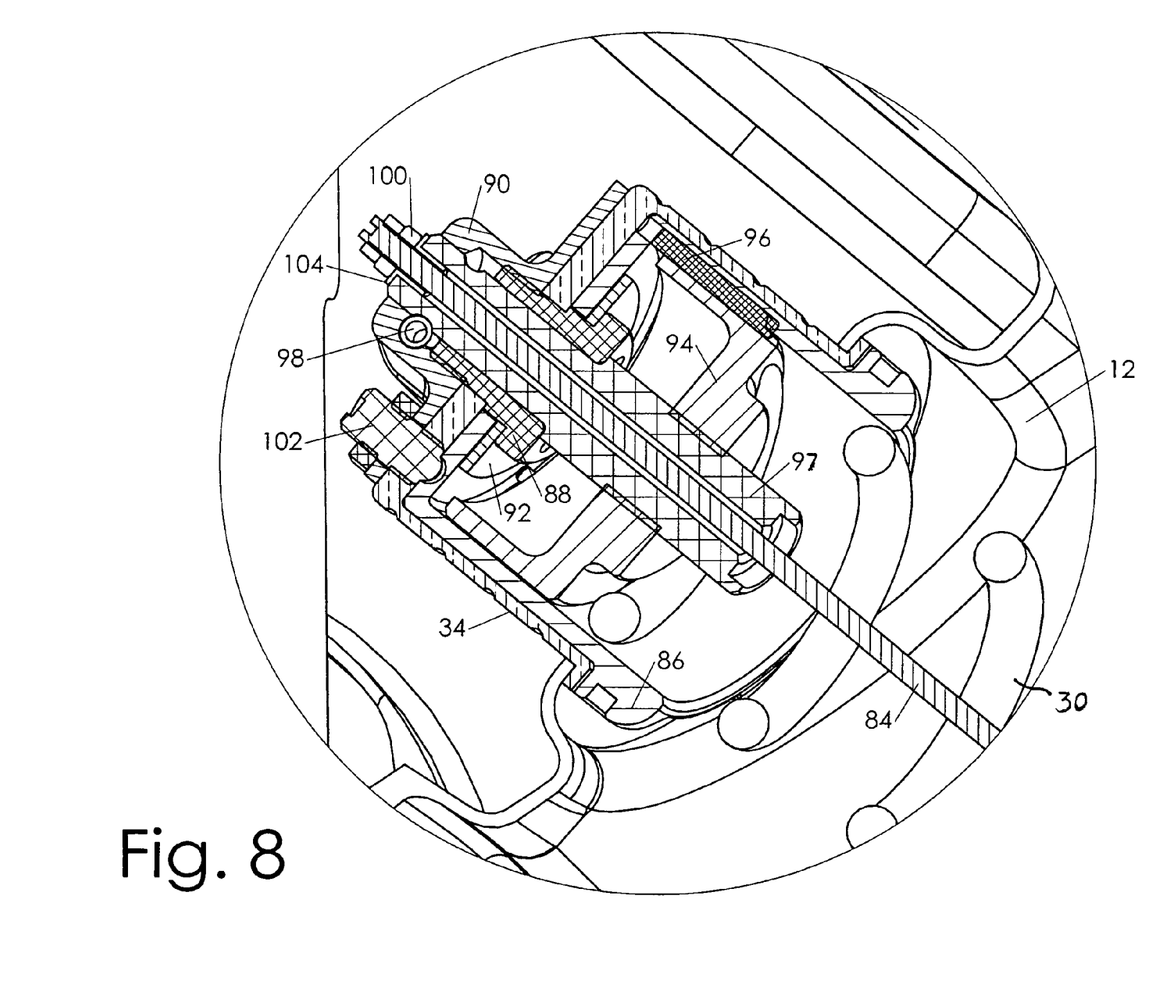
FIGS. 8 and 9 show detail views of the rear spring preload adjustment mechanism.

FIG. 8 is a close-up view of the section of the rear suspension where the upper end of the spring 30 contacts the frame 12. The frame includes an upper spring coupling fixture 34 which is integral with or coupled to the frame. A spring preload adjuster cup 86 is disposed within the fixture and is held axially by a bolt 88 which extends through an axial hole in the cup and engages the fixture and/or a backing plate 90 on the opposite side of the fixture. A Teflon washer 92 reduces friction between the cup and the bolt, enabling the bolt to turn more easily. Although not shown, a cylindrical Teflon bushing could also be positioned between the cylindrical walls of the cup and fixture, further reducing friction.

An upper spring base 94 is disposed within the cup. A plurality of cylindrical pins 96 are disposed within matching grooves in the inner cylindrical wall of the cup and the outer cylindrical wall of the upper spring base, preventing the upper spring base from rotating relative to the cup but permitting the upper spring base to move axially within the cup. A threaded cylindrical outer surface of a preload adjuster linkage 97 engages a threaded axial hole in the upper spring base. The linkage extends into or through the backing plate, and is held by a retainer pin 98 which prevents the linkage from moving axially but permits rotation of the linkage, in that the pin engages a circumferential groove in the linkage.

The rod 84 extends axially through this whole assembly. One or more jam nuts 100 or the like prevent the end of the rod from slipping back into the backing plate. The other end of the rod is threaded into the swingarm assembly. Therefore, when the rear suspension sags or extends downward, such as when airborne or when traversing a bumpy section of racetrack, the rod limits the downward travel of the swingarm, preventing the springs from falling out of their cups. When the suspension compresses, the swingarm comes closer to the frame, and the rod extends farther through the preload adjustment assembly. An optional Teflon bushing 104 can be used to reduce friction between the rod and the linkage as the suspension moves.

Figure 9:
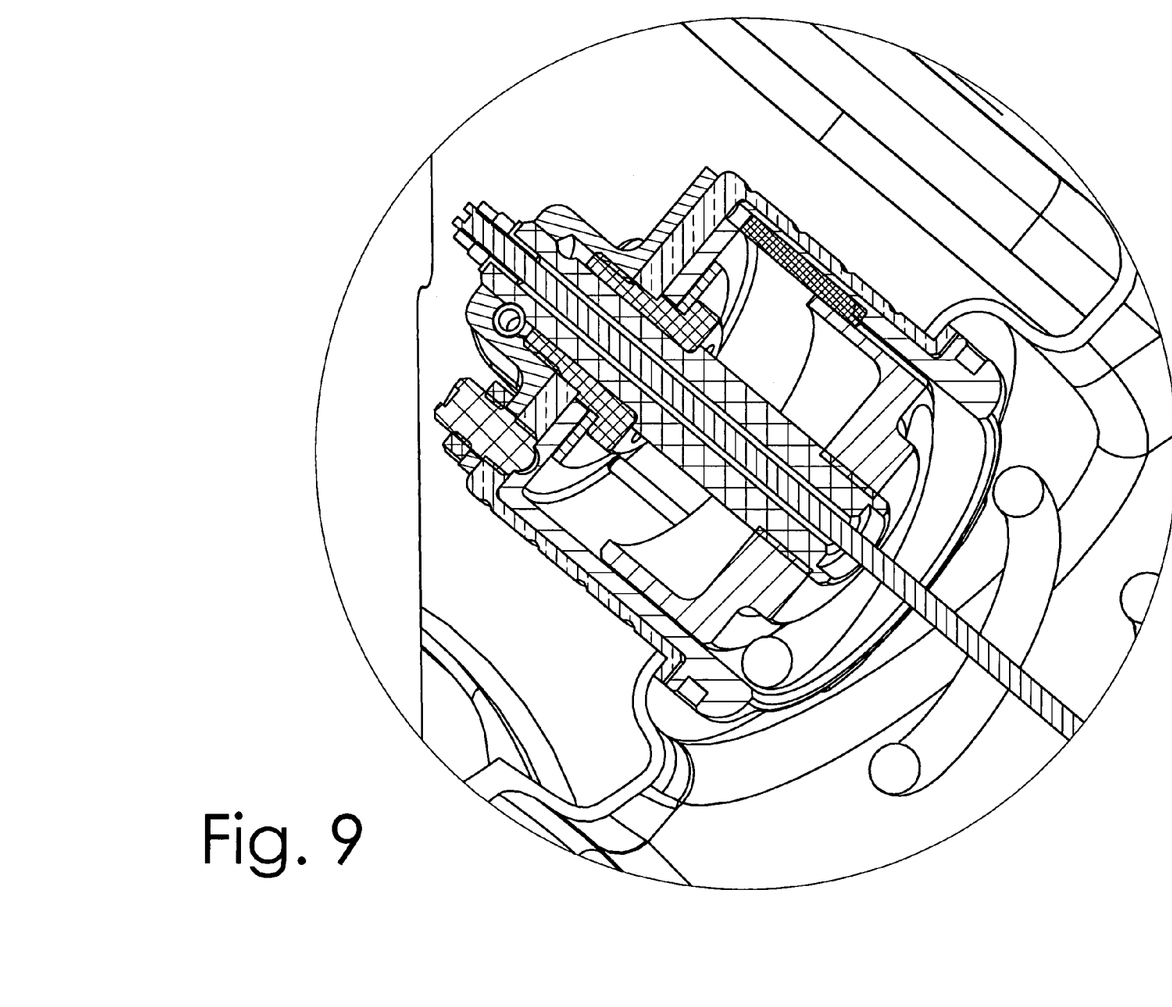

When the preload adjuster cup is rotated, the pins 96 force the upper spring base to rotate with the cup. The threads on the linkage cause the upper spring base to move gradually into the cup (FIG. 8) or out of the cup (FIG. 9), altering the preload on the spring. The cup can be provided with one or more clicker adjusters 102 such as described above.

Because the preload adjuster cup itself does not move in or out of the swingarm, the spring preload can be adjusted without altering the visual appearance and aesthetic appeal of the rear suspension assembly. Each of the rear springs can be provided with such a preload adjustment mechanism, for suspension symmetry.

The rod retention pin 98 can optionally be provided with a retraction mechanism for withdrawing the pin and permitting rod, linkage, and spring base to fall clear of the cup. This facilitates quickly changing the rear springs, simply by putting the motorcycle on a center stand so the rear tire is sufficiently off the ground and by pulling the pins, dropping the swingarm assembly until the springs can be removed.

Alternatively, if the jam nuts are removed from the end of the rod, the rod alone can fall clear when the motorcycle is raised.

CONCLUSION

The absolute and relative sizes of the various suspension components are shown in the drawings for ease of illustration only. In practice, the skilled designer will select components of various geometries according to the needs of the application at hand.

When one component is said to be "adjacent" another component, it should not be interpreted to mean that there is absolutely nothing between the two components, only that they are in the order indicated.

The respective positions of the ride height adjustment mechanism and the preload adjustment mechanism could be reversed. The rod could be made to extend into the swingarm rather than into the frame, when the suspension is compressed.

The threading mechanism and sliding mechanisms of the ride height adjuster and the preload adjuster could be swapped in some embodiments.

The various features illustrated in the figures may be combined in many ways, and should not be interpreted as though limited to the specific embodiments in which they were explained and shown.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. A motorcycle comprising:
a frame;
an engine coupled to the frame;
a front wheel coupled to the frame by a front suspension;
a swingarm pivotably coupled to one of the engine and the frame;
a rear wheel coupled to the swingarm;
a spring coupled to the swingarm and to one of the engine and the frame;
a linkage coupled to the swingarm and to one of the engine and the frame; and
a shock absorber coupled to the linkage and to one of the engine, the frame, and the swingarm;
wherein the spring is separate from any shock absorbers.

2. The motorcycle of claim 1 wherein:
the swingarm is pivotably coupled to the engine;
the spring is coupled to the swingarm and to the frame;
the linkage is coupled to the swingarm and to the engine; and
the shock absorber is coupled to the linkage and to the swingarm.

3. The motorcycle of claim 1 wherein the linkage comprises:
a multiplier link having,
a first end pivotably coupled to one of the frame and the engine,
a second end pivotably coupled to the shock absorber, and
a center pivot disposed between the first and second ends; and
a dogbone having,
a first end pivotably coupled to the center pivot, and
a second end pivotably coupled to the swingarm.

4. An improvement in a motorcycle, the motorcycle having a frame, an engine, a front wheel coupled to the frame by a front suspension, a swingarm rotatably coupled to one of the frame and the engine, a rear wheel coupled to the swingarm, a shock absorber, and a spring, wherein the improvement comprises:
the spring being coupled between the swingarm and one of the frame and the engine, the spring including a substantially linear leverage rate; and
the shock absorber being coupled to the swingarm by a linkage and being coupled between the swingarm and one of the frame and the engine, the shock absorber including a shock leverage rate different from the substantially linear leverage rate.

5. A motorcycle comprising:
a frame;
an engine coupled to and serving as a stressed member of the frame;
a swingarm pivotably coupled to the engine;
a pair of coil springs each having an upper end in contact with the frame and a lower end in contact with the swingarm;
a shock absorber having an upper end coupled to the swingarm;
a multiplier link having a first end pivotably coupled to the engine and a second end pivotably coupled to a lower end of the shock absorber;
a dogbone having a first end pivotably coupled to the swingarm and a second end pivotably coupled to the multiplier link.

6. The motorcycle of claim 5 further comprising:
a second multiplier link having a first end pivotably coupled to the engine and a second end pivotably coupled to the lower end of the shock absorber; and
a second dogbone having a first end pivotably coupled to the swingarm and a second end pivotably coupled to the second multiplier link.

7. A motorcycle comprising:
a frame;
an engine coupled to the frame;
a front wheel coupled to one of the frame and the engine by a front suspension;
a swingarm pivotably coupled to one of the frame and the engine;
a rear wheel coupled to the swingarm;
a spring having an upper end coupled to one of the engine and the frame, and having a lower end coupled to the swingarm;
a ride height adjuster cup coupled to one of the swingarm, the engine, and the frame, and having a threaded cylindrical inner surface; and
a spring base at least partially disposed within the ride height adjuster cup and coupled to an end of the spring and having a threaded cylindrical outer surface in threaded engagement with the threaded cylindrical inner surface of the ride height adjuster cup;
whereby a rear ride height of the motorcycle can be adjusted by turning the ride height adjuster cup to raise and lower the spring base within the ride height adjuster cup.

8. The motorcycle of claim 7 wherein:
the ride height adjuster cup is coupled to the swingarm.

9. The motorcycle of claim 7 further comprising:
a second spring having an upper end coupled to one of the engine and the frame, and having a lower end;
a second ride height adjuster cup coupled to the swingarm and having a threaded cylindrical inner surface; and
a second spring base at least partially disposed within the second ride height adjuster cup and coupled to the lower end of the second spring and having a threaded cylindrical outer surface in threaded engagement with the threaded cylindrical inner surface of the second ride height adjuster cup.

10. The motorcycle of claim 7 further comprising:
a rod coupled between the swingarm and one of the engine and the frame to limit downward extension of the swingarm.

11. The motorcycle of claim 10 further comprising:
a preload adjuster coupled to the spring whereby a maximum length of the spring can be controlled, to set a preload of the spring.

12. The motorcycle of claim 7 further comprising:
a linkage coupled to one of the frame and the swingarm; and
a shock absorber having a first end coupled to the swingarm and a second end coupled to the linkage.

13. A motorcycle comprising:
a frame;
an engine coupled to the frame;
a front wheel coupled to the frame by a front suspension;
a swingarm pivotably coupled to one of the engine and the frame;
a rear wheel coupled to the swingarm;
a spring coupled to the swingarm and to one of the engine and the frame; and
a rear ride height adjustment mechanism coupled between the spring and a coupling fixture of one of the swingarm, the engine, and the frame, the rear ride height adjustment mechanism including,
a ride height adjuster cup rotatably disposed within the coupling fixture,
a bolt axially securing the ride height adjuster cup to the coupling fixture, the bolt including a non-cylindrical axial hole,
a spring base disposed within and in threaded engagement with the ride height adjuster cup, the spring base including a non-cylindrical stem extending into the axial hole of the bolt, and the spring being in contact with the spring base,
whereby rotation of the spring base is prevented relative to the coupling fixture and whereby the spring base is moved axially in response to rotation of the ride height adjuster cup.

14. A motorcycle comprising:
a frame;
an engine coupled to the frame;
a front wheel coupled to the frame by a front suspension;
a swingarm pivotably coupled to one of the engine and the frame;
a rear wheel coupled to the swingarm;
a spring coupled to the swingarm and to one of the engine and the frame; and
a rear spring preload adjustment mechanism coupled between the spring and a coupling fixture of one of the swingarm, the engine, and the frame, the rear spring preload adjustment mechanism including,
a preload adjuster cup rotatably disposed within the coupling fixture,
a bolt axially securing the preload adjuster cup to the coupling fixture, the bolt including an axial hole,
a spring base disposed within and in threaded engagement with the preload adjuster cup,
means for preventing the spring base from rotating with respect to the preload adjuster cup and for permitting the spring base to move axially with respect to the preload adjuster cup,
the spring being in contact with the spring base,
a preload adjuster linkage coupled to the coupling fixture and having a threaded engagement with the spring base,
whereby the spring base is moved axially in response to rotation of the preload adjuster cup.

15. An improvement in a motorcycle, the motorcycle having a frame, an engine, a front wheel coupled to the frame by a front suspension, a swingarm rotatably coupled to one of the frame and the engine, a rear wheel coupled to the swingarm, a shock absorber, and a spring, wherein the improvement comprises:
the spring being coupled between the swingarm and one of the frame and the engine, the spring including a substantially linear leverage rate; and
the shock absorber being coupled between the swingarm and one of the frame and the engine, the shock absorber including a shock leverage rate different from the substantially linear leverage rate and wherein the shock leverage rate comprises one of a falling rate, a rising rate and a linear rate.

16. An improvement in a motorcycle, the motorcycle having a frame, an engine, a front wheel coupled to the frame by a front suspension, a swingarm rotatably coupled to one of the frame and the engine, a rear wheel coupled to the swingarm, a shock absorber, and a spring, wherein the improvement comprises:
the spring being coupled between the swingarm and one of the frame and the engine, the spring including a substantially linear leverage rate; and
the shock absorber being coupled between the swingarm and one of the frame and the engine, the shock absorber including a shock leverage rate different from the substantially linear leverage rate, and wherein the shock leverage rate comprises a combination of rising and falling rates.

17. An improvement in a motorcycle, the motorcycle having a frame, an engine, a front wheel coupled to the frame by a front suspension, a swingarm rotatably coupled to one of the frame and the engine, a rear wheel coupled to the swingarm, a shock absorber, and a spring, wherein the improvement comprises:
the spring being coupled between the swingarm and one of the frame and the engine so as to have a first leverage rate curve that is substantially linear over a travel range of the swingarm; and
the shock absorber being coupled between the swingarm and one of the frame and the engine so as to have a second leverage rate curve over the travel range of the swingarm;
wherein the second leverage rate curve is different than the first leverage rate curve and comprises one of a falling rate curve, a rising rate curve, and a hybrid rising/falling rate curve.

18. An improvement in a motorcycle, the motorcycle having a frame, an engine, a front wheel coupled to the frame by a front suspension, a swingarm rotatably coupled to one of the frame and the engine, a rear wheel coupled to the swingarm, a shock absorber, and a spring, wherein the improvement comprises:

the spring being coupled between the swingarm and one of the frame and the engine so as to have a first leverage rate curve over a travel range of the swingarm; and the shock absorber being coupled to the swingarm by a linkage and being coupled between the swingarm and one of the frame and the engine so as to have a second leverage rate curve over the travel range of the swingarm;

wherein the second leverage rate curve is different than the first leverage rate curve.

19. A motorcycle comprising:

a frame;

an engine coupled to and serving as a stressed member of the frame;

a swingarm pivotably coupled to the engine;

a pair of coil springs each having an upper end in contact with the frame and a lower end in contact with the swingarm;

a shock absorber having an upper end coupled to the swingarm;

a multiplier link having a first end pivotably coupled to the engine and a second end pivotably coupled to a Lower end of the shock absorber;

a dogbone having a first end pivotably coupled to the swingarm and a second end pivotably coupled to the multiplier link;

a second multiplier link having a first end pivotably coupled to the engine and a second end pivotably coupled to the lower end of the shock absorber; and a second dogbone having a first end pivotably coupled to the swingarm and a second end pivotably coupled to the second multiplier link.

\* \* \* \* \*